United States Patent [19]

Stapleton

[11] Patent Number: 5,161,246

[45] Date of Patent: Nov. 3, 1992

[54] SENSOR FOR SENSING MEDIA IN A PLOTTER

[75] Inventor: Jeff T. Stapleton, Huntington Beach, Calif.

[73] Assignee: Calcomp Inc., Anaheim, Calif.

[21] Appl. No.: 694,562

[22] Filed: May 2, 1991

[51] Int. Cl.[5] ............................................. G06K 15/00
[52] U.S. Cl. .................................... 395/111; 395/103
[58] Field of Search ........................ 395/103, 105, 111;
400/630, 632, 632.1; 355/309, 313, 314;
271/258, 259, 265, 152–154; 346/154, 134, 136;
226/45; 358/498; 250/571

[56] References Cited

U.S. PATENT DOCUMENTS 4,630,814 12/1986 Kowakubo et al. ............. 400/639.1
4,998,216 3/1991 Hino et al. ........................... 395/111

Primary Examiner—Arthur G. Evans
Attorney, Agent, or Firm—Donald A. Streck; Wm. F. Porter, Jr.

[57] ABSTRACT

This invention is directed to the use of single optical sensor to replace two mechanical sensors in a pen plotter. A light beam is directed through a slot in the plotter's main platen. The light beam is detected to provide a signal output. Servo fan motors of the plotter are turned on when the light beam is broken by media placed into the plotter for plotting as one function. A load sequence of the plotter is started only after a start command is input by a user through a control console and the light beam is broken by media placed into the plotter for plotting as a second function.

4 Claims, 1 Drawing Sheet

PRIOR ART

SENSOR FOR SENSING MEDIA IN A PLOTTER

BACKGROUND OF THE INVENTION

This invention relates to pen plotters and control apparatus therefor and, more particularly, to a dual-function single-sensor system for use in a pen plotter wherein plotting media is moved over a platen by a pinch roller and drive drum assembly controlled by plotter control logic in response to commands from a user through a control console and the plotter control logic also turns a motor on when needed for plotting and off when not needed for plotting, comprising, a slot in the platen adjacent the pinch roller and drive drum; a source of a light beam disposed on one side of the slot and directing the light beam through the slot; a photodetector disposed on an opposite side of the slot to receive the light beam and provide an electrical signal at an output thereof, the output being connected to the plotter control logic to be sensed thereby whereby the plotter control logic can determine the presence of plotting media breaking the light beam; and, supplemental logic means included within the plotter control logic for turning the motor on when the presence of plotting media breaking the light beam is detected and for turning the motor off when the presence of plotting media breaking the light beam is not detected and for allowing a loading and plotting sequence of the plotter control logic to begin only after a start command is input by a user through the control console and the presence of plotting media breaking the light beam is detected.

In a typical pen plotter, apparatus is included as depicted in simplified form in FIG. 1. There is plotter control logic 10 connected to control the operation of a plotter mechanism 12 and start servo fan motors 14 partially as a function of inputs from various sensors 16. The plotter operates by a sheet of plotting media being inserted between a drive drum and pinch rollers. The pinch rollers are lowered to hold the media against the drive drum. Thus, as the drive drum rotates forward and backward, the media is correspondingly moved forward and backward under a beam carrying a plotting head which moves transversely across the media. The movement of the media in combination with the movement of the plotting head creates movement of a plotting pen carried by the plotting head in both directions of an X-Y co-ordinate system of the plotter. This, of course, comprises what is represented in FIG. 1 by the plotter mechanism represented by block 12 and is all well known and standard in a pen plotter of common design.

Typically, the plotter control logic 10 is adapted to not operate the plotter mechanism 12 unless there is media properly disposed between the drive drum and the pinch roller. For this purpose, there is a sensor included among the sensors represented by block 16. For example, in a prior art pen plotter manufactured by the assignee of this application, a spring-biased spring was urged upwardly through a hole in a platen surface over which the media passes to be properly disposed between the drive drum and the pinch roller. When the media passed over the pin, the pin was forced down to provide a mechanical/electrical indication of detection of the media edge.

Also, for noise and energy conservation reasons, the plotter control logic 10 is adapted to turn on the motor servos for the vacuum fans represented by the fan 14 only when the media was in position and the pinch rollers were lowered onto the drive roller so that the plotter was ready to plot. In the same prior art plotter of the assignee of this application mentioned above, the pinch rollers were lifted up, a switch was activated with turned the motor servos off.

As can be appreciated, the foregoing prior art approach required to mechanical switches and accompanying switch activating mechanisms. Such apparatus adds to the manufacturing cost of a pen plotter and adds to its susceptibility to breakage as mechanical linkages and switches are more prone to breakage from metal fatigue and contact arcing and pitting, for example.

Wherefore, it is the object of the present invention to provide sensor input to the plotter control logic of a pen plotter which will allow the logic to sense the presence of a media leading edge in position and control the operation of the motor servos for the vacuum fans in a simple and reliable way.

Other objects and benefits of the invention will become apparent from the detailed description which follows hereinafter when taken in conjunction with the drawing figures which accompany it.

SUMMARY

The foregoing object has been achieved in a pen plotter wherein plotting media is moved over a platen by a pinch roller and drive drum assembly controlled by plotter control logic in response to commands from a user through a control console and the plotter control logic also turns a motor on when needed for plotting and off when not needed for plotting, by the single sensor system of the present invention for performing two functions comprising, a slot in the platen adjacent the pinch roller and drive drum; a source of a light beam directing a light beam through the slot; a photodetector disposed to receive the light beam and provide an electrical signal at an output thereof, the output being connected to the plotter control logic to be sensed thereby whereby the plotter control logic can determine the presence of plotting media breaking the light beam; first supplemental logic means included within the plotter control logic for turning the motor on when the presence of plotting media breaking the light beam is detected and for turning the motor off when the presence of plotting media breaking the light beam is not detected; and, second supplemental logic means included within the plotter control logic for allowing a loading and plotting sequence of the plotter control logic to begin only after a start command is input by a user through the control console and the presence of plotting media breaking the light beam is detected.

DESCRIPTION OF THE PREFERRED EMBODIMENT

Figure 2:
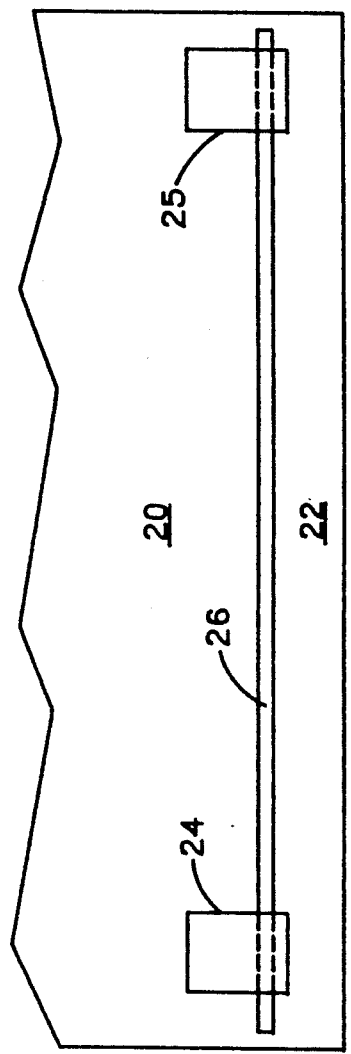
FIG. 2 is a simplified plan view of apparatus for implementing the present invention.
Figure 1:
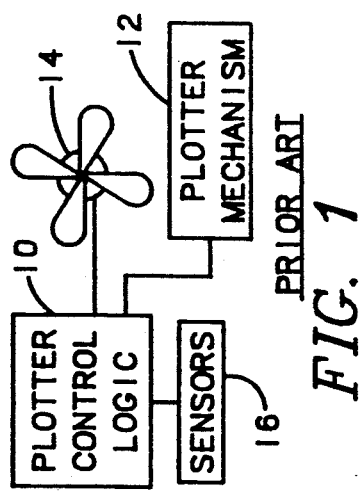
FIG. 1 is a simplified functional block diagram drawing of prior art apparatus as wherein the present invention is applicable.
Figure 3:
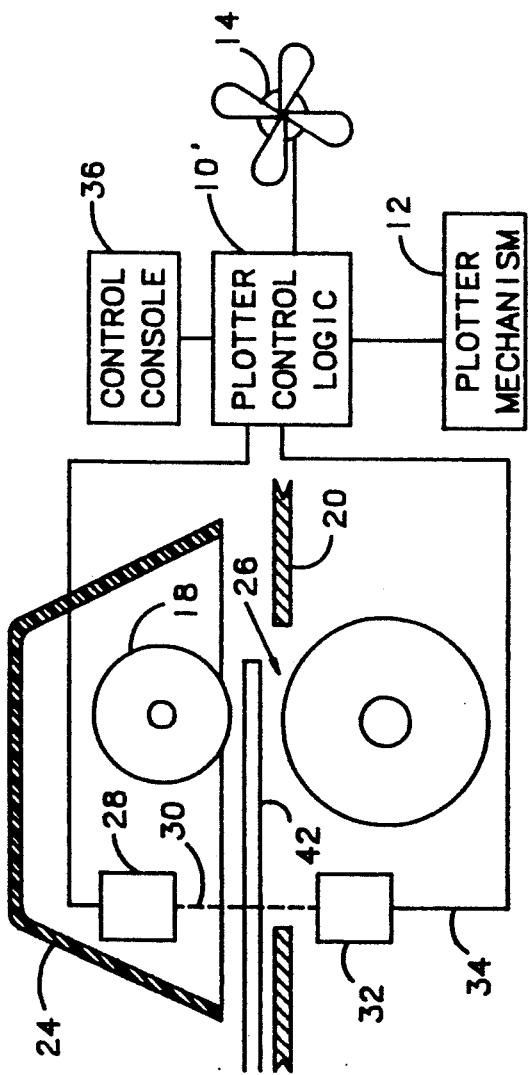
FIG. 3 is a simplified partially cutaway end view of the apparatus of FIG. 2 in combination with a functional block diagram.

The apparatus of the present invention is shown in FIGS. 2 and 3. For simplicity and the avoidance of redundancy, portions of a pen plotter not involved with the present invention are not shown.

The pinch rollers 18 are carried above the main platen 20 and behind a platen extension 22 by supports 24 and 25 which are slideable from side to side as FIG. 2 is viewed. The main platen 20 has a slot 26 therein extending longitudinally across the platen 20. In a tested embodiment, the left support 24 includes a source 28 of a light beam 30 which is directed down through the slot 26 to strike a photodetector 32 disposed under the slot 26. The output 34 of the photodetector 32 is connected to be sensed by the plotter control logic 10'. In addition to being connected to control the servo motors as symbolized by the fan 14 and the plotter mechanism 12, the plotter control logic 10' is also connected to receive control inputs from users via a control console 36 in a manner which is common for pen plotters.

Figure 4:
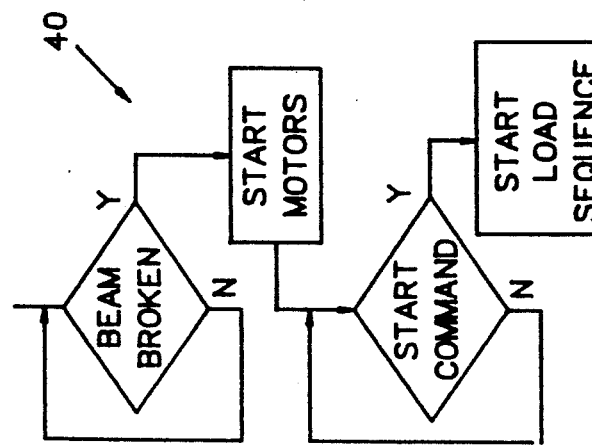
FIG. 4 is a simplified flowchart of logic to be added to the plotter control logic in order to implement the present invention.

As thus configured, with the addition of certain logic to the plotter control logic 10' as will not be described, the single optical sensor 38 can be employed to perform the functions of the two mechanical sensors of the prior art as described above. The necessary logic 40 is shown in the simplified flowchart of FIG. 4. When the leading edge 42 of the media interrupts the light beam 30, the logic 40 senses in change in the signal from the photodetector 32 and starts the servo motors as symbolized by the fan 14. After an appropriate command has been entered by a user through the control console 36 indicating that the load sequence is to be started, when the leading edge 42 of the media interrupts the light beam 30 and the logic 40 senses the change in the signal from the photodetector 32 the logic 40 allows the balance of the plotter control logic 10' to begin the loading and plotting sequence of the plotter to begin.

As those skilled in the art will readily recognize and appreciate, the light source 28 and photodetector 32 could be placed on the same side of the slot 26 and the light beam reflected back through the slot 26 by a mirror disposed on the opposite side rather than placing the light source 28 and photodetector 32 on opposite sides of the slot 26. Such an implementation is to be included within the scope and spirit of the present invention in determining the breadth to be accorded the claims which are appended hereto despite the use of the specific example contained herein and the designation of the light source 28 and photodetector 32 being disposed on opposite sides of the slot 26 inasmuch as such a reflective arrangement would functionally accomplish the same results.

Thus, it can be seen from the foregoing description and the accompanying drawing figures that the present invention has truly met is stated objective by allowing a single optical sensor to be employed to perform the functions previously performed by two separate mechanical sensors.

Wherefore, having thus described the present invention, what is claimed is:

1. In a pen plotter wherein plotting media is moved over a platen by a pinch roller and drive drum assembly controlled by plotter control logic in response to commands from a user through a control console and the plotter control logic also turns a motor on when needed for plotting and off when not needed for plotting, a single sensor system for performing two functions comprising:

a) a slot in the platen adjacent the pinch roller and drive drum;

b) a source of a light beam directing a light beam through said slot;

c) a photodetector disposed to receive said light beam and provide an electrical signal at an output thereof, said output being connected to said plotter control logic to be sensed thereby whereby said plotter control logic can determine the presence of plotting media breaking said light beam;

d) first supplemental logic means included within the plotter control logic for turning the motor on when the presence of plotting media breaking said light beam is detected and for turning the motor off when the presence of plotting media breaking said light beam is not detected; and, e) second supplemental logic means included within the plotter control logic for allowing a loading and plotting sequence of the plotter control logic to begin only after a start command is input by a user through the control console and the presence of plotting media breaking said light beam is detected.

2. In a pen plotter wherein plotting media is moved over a platen by a pinch roller and drive drum assembly controlled by plotter control logic in response to commands from a user through a control console and the plotter control logic also turns a motor on when needed for plotting and off when not needed for plotting, a single sensor system for performing two functions comprising:

a) a slot in the platen adjacent the pinch roller and drive drum;

b) a source of a light beam disposed on one side of said slot and directing said light beam through said slot;

c) a photodector disposed on an opposite side of said slot to receive said light beam and provide an electrical signal at an ouput thereof, said output being connected to said plotter control logic to be sensed thereby whereby said plotter control logic can determine the presence of plotting media breaking said light beam; and, d) supplemental logic means included within the plotter control logic for turning the motor on when the presence of plotting media breaking said light beam is detected and for turning the motor off when the presence of plotting media breaking said light beam is not detected and for allowing a loading and plotting sequence of the plotter control logic to begin only after a start command is input by a user through the control console and the presence of plotting media breaking said light beam is detected.

3. A dual-function single-sensor system for use in a pen plotter wherein plotting media is moved over a platen by a pinch roller and drive drum assembly controlled by plotter control logic in response to commands from a user through a control console and the plotter control logic also turns a motor on when needed for plotting and off when not needed for plotting, comprising:

a) a slot in the platen adjacent the pinch roller and drive drum;

b) a source of a light beam directing a light beam through said slot;

c) a photodetector disposed to receive said light beam and provide an electrical signal at an output thereof, said output being connected to said plotter control logic to be sensed thereby whereby said plotter control logic can determine the presence of plotting media in a plotting position breaking said light beam; and, d) supplemental logic means included within the plotter control logic for turning the motor on when the presence of plotting media breaking said light beam is detected and for turning the motor off when the presence of plotting media breaking said light beam is not detected and for allowing a loading and plotting sequence of the plotter control logic to begin only after a start command is input by a user through the control console and the presence of plotting media breaking said light beam is detected.

4. In a pen plotter wherein plotting media is moved over a platen by a pinch roller and drive drum assembly controlled by plotter control logic in response to commands from a user through a control console and the plotter control logic also turns a motor on when needed for plotting and off when not needed for plotting, a method of performing two functions with a single sensor system comprising the steps of:

a) forming a slot in the platen adjacent the pinch roller and drive drum;
b) directing a light beam through the slot;
c) disposing a photodetector to receive the light beam and provide an electrical signal at an output thereof indicating the presence of plotting media in a position for plotting breaking the light beam;
d) turning the motor on when the presence of plotting media breaking the light beam is detected;
e) turning the motor off when the presence of plotting media breaking the light beam is not detected; and,
f) allowing a loading and plotting sequence of the plotter control logic to begin only after a start command is input by a user through the control console and the presence of plotting media breaking the light beam is detected.

* * * * *